Oct. 13, 1953     L. A. CLARK     2,655,341
TIRE MOVING APPLIANCE
Filed May 6, 1949     2 Sheets-Sheet 1
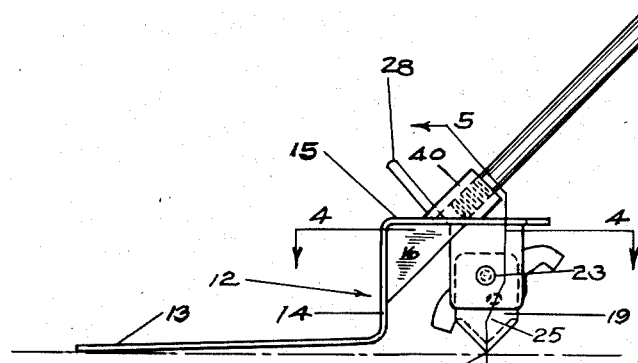
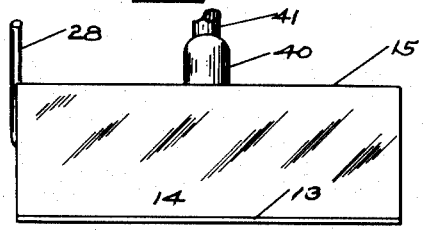
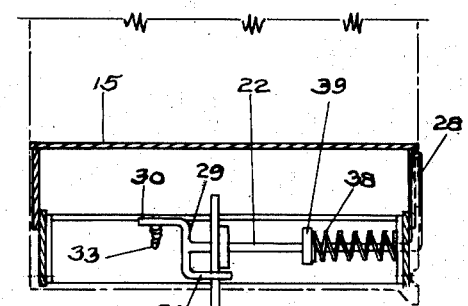
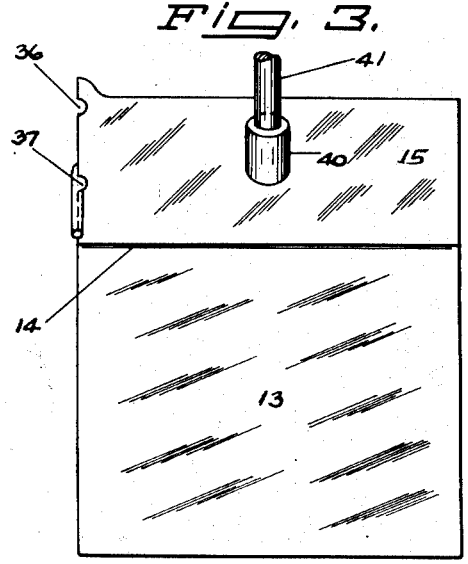
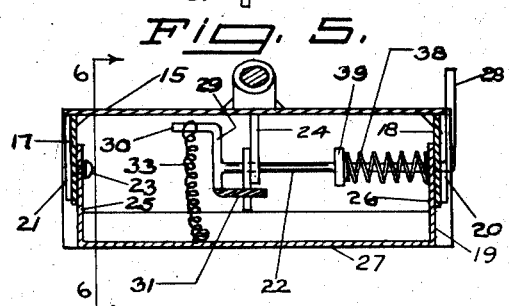
INVENTOR.
LAWRENCE A. CLARK
BY
Edward C. Healy
ATTORNEY Oct. 13, 1953 L. A. CLARK 2,655,341
TIRE MOVING APPLIANCE
Filed May 6, 1949 2 Sheets-Sheet 2
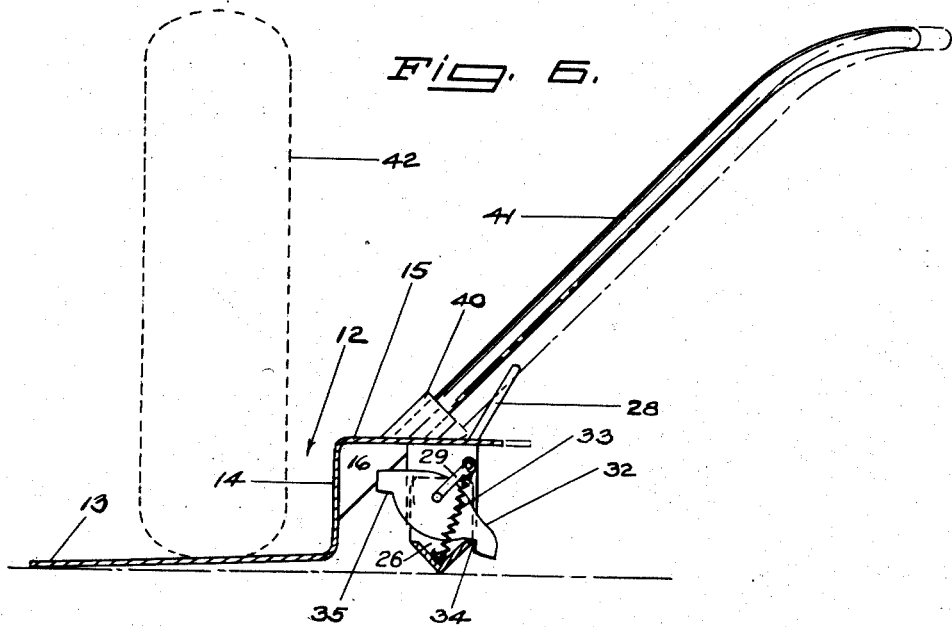
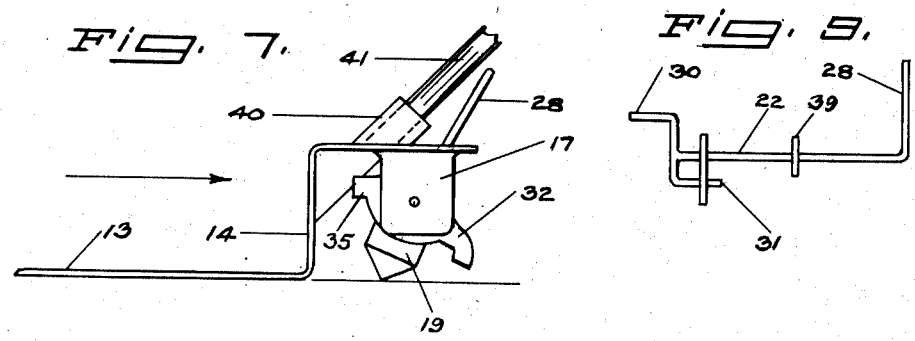
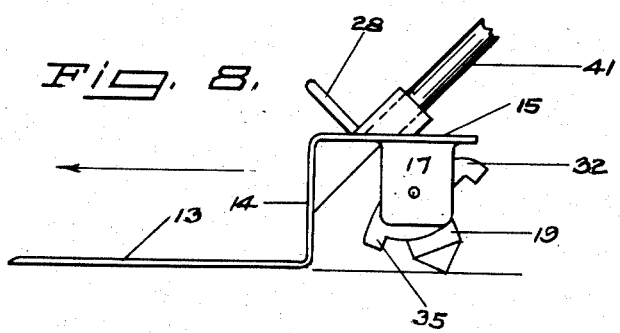
INVENTOR.
LAWRENCE A. CLARK
BY Edward C. Healy
ATTORNEY

Patented Oct. 13, 1953

2,655,341

UNITED STATES PATENT OFFICE 2,655,341

TIRE MOVING APPLIANCE

Lawrence A. Clark, Coalinga, Calif.

Application May 6, 1949, Serial No. 91,827

2 Claims. (Cl. 254—131)

This invention relates to an improved tire moving appliance and has particular reference to a specially constructed device for conveying large heavy tires to and from the axles of truck and the like upon which they are mounted.

It is a well known fact that when tires on trucks are to be shipped it is most difficult to perform this operation, due to the fact that the combined wheel and tire are exceedingly heavy and cumbersome.

An object of the present invention is accordingly the provision of a movable device that is capable of being readily slid beneath the outer periphery of the tire and which is provided with a mechanism for "walking the tire" to and from the wheel axle of the truck.

Another object of the present invention is to preferably construct the device of an angular support having a horizontally flat base for carrying the tire and to provide a rocking tread member pivotally connected to the said support for imparting longitudinal movement to the said base upon which the tire is carried.

A further object of the present invention is the provision of a specially constructed catch and a locking lever for controlling the movement of the tread, whereby the base member carrying the tire can be moved forwardly or backwardly.

A still further object of the present invention is to preferably form the said rocking tread member in an angular shape to provide an efficient medium for gripping the surface upon which the said base member is moved.

A still further object of the present invention is the provision of a resilient means for controlling the angular tread member, and a second resilient means for controlling the lever.

A still further object of the present invention is the provision of a tire moving appliance that is durable, simple in construction, economical to manufacture and highly efficient and serviceable in use.

Other objects and advantages will be apparent during the course of the following description.

In accompanying drawing forming a part of the specification and in which like numerals are employed to designate like parts throughout the same, Fig. 1 is a side elevational view of the improved tire moving appliance, with the catch adjusted for controlling the forward movement of the appliance, Fig. 2 is a front elevational view of the base member and a fragmentary view of the handle, Fig. 3 is a top plan view of the appliance, Fig. 4 is a sectional plan view taken through line 4—4 of Fig. 1, Fig. 5 is a vertical sectional view view taken through line 5—5 of Fig. 1, the handle being removed for the purpose of clarity.

Fig. 6 is a vertical sectional view of the appliance taken through line 6—6 of Fig. 5, looking in direction of the arrows showing the catch in the position locking the tread member for preventing forward movement and enabling rearward movement to be imparted to the appliance, Fig. 7 is a side elevational view of the appliance showing the direction the tread member moves for imparting rearward movement to the appliance, Fig. 8 is a side elevational view showing the direction the tread member moves for imparting forward movement to the appliance, and Fig. 9 is a side elevational view of a lever and catch employed in the invention.

Referring in detail to the drawing and numerals thereof, the numeral 12 designates, as a whole, the specially formed base member and frame employed in the invention for carrying the tire and embodies in its construction a flat base plate 13 having an upwardly extending back 14 and a top rear plate 15 formed integrally with the said back, or suitably secured thereto as disclosed to advantage in Fig. 1. Suitable webs 16 are fixed to the said back and top to increase the rigidity and strength of the same. A pair of oppositely disposed downwardly extending lips 17 and 18 are fixed to the said top and provide a supporting means for carrying the rocking tread member 19, which tread member is pivotally secured to the said lips as disclosed to advantage at 20 and 21 in Fig. 5. The said pivoting means consists in the provision of a lever rod 22 and a pin 23 extending through the said lips, a central lip 24 serving to pivotally support the said rod. The said rocking tread member is formed with upwardly extending lips 25 and 26 and the lower portion thereof is preferably angular in shape and pointed, as at 27 to provide a gripping medium for facilitating the movement of the base member. The rod 22 is formed with an outer lever 28 and an inner lever 29, the said inner lever having oppositely disposed upper and lower horizontal extensions 30 and 31 that extend in opposite directions, one from the other, as disclosed to advantage in Figs. 5 and 9. The lower extension 31 is welded to or otherwise suitably fixed to a specially constructed dog 32 and the upper extension is resiliently connected to the rocking tread member 19 by a coil spring 33 as disclosed to advantage in Figs. 5 and 6. The said dog, fixed to the lower lever rod extension 31, is formed with two catches 34 and 35, which catches are adapted to engage the rocking tread member, the catch 34 preventing the tread from moving in the forward direction and the catch 35 preventing the tread from moving in the rear direction. The top is formed with two slotted openings in the outer edge thereof, as at 36 and 37, for retaining the said outer lever 28, whereby the dog 32 is retained in two different positions for controlling the forward and rearward movement of the rocking tread member 19. A coil spring 38 is mounted on the lever rod 22 and compressed thereon between the collar 39 and the upper tread lip 26, as disclosed in Fig. 5, for resiliently retaining the outer lever 28 in either one of the said slotted openings 36 and 37. A lug 40 is fixed to the top 15 and a suitable handle 41 is threadedly secured therein.

From the foregoing description taken in conjunction with the accompanying drawing it is obvious that when the dog 32 is adjusted to the position as shown in Fig. 1, the rocking tread member 19 will take the position as shown in Fig. 8 when the handle 41 is moved forwardly and will thus move the base plate 13, carrying the tire 42 thereon, shown in dotted lines, forward. Likewise, when the said dog is adjusted to the position as shown in Fig. 6 and the handle is lifted slightly and pulled backwardly, the tread member will take the position as shown in Fig. 7 and the base plate carrying the tire will be moved rearwardly. It will be noted in Figs. 1 and 6, that the rocking tread member 19 extends below the lower plane of the rear portion of the base plate 13 and the weight of the tire is carried on the rocking tread member 19 and the forward edge of the base plate. The distance the rocking tread member extends below the base plate controls the length of "step" taken by the tire walker.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:

1. A device of the character described for moving tires mounted on wheels to the axles upon which the wheels are to be assembled comprising, an angular shaped supporting base member capable of being slidably positioned beneath the tire and carrying the same, a pointed rocker tread element pivotally secured to the said base member, a resiliently retained dog connecting the rocker to the said base member to limit the relative movement between the rocker and said base member, and a handle extending at an angle from the supporting member for enabling manual movement to be applied to said supporting member for operating the rocker tread element.

2. A device of the character described for moving tires mounted on wheels to the axles upon which the wheels are to be placed comprising a base member capable of being slidably positioned beneath the tire and carrying the same, a back extending vertically upwardly from the base member, a top rear plate integrally formed with said back, a pair of oppositely disposed lips extending downwardly from said plate and fixed thereto, a pointed rocker tread element pivotally secured to the said lips and extending below the same, a dog pivotally connected to the lips, a lever fixed to the said dog and extending upwardly therefrom, a coil spring connected to the lever and rocker tread element for resiliently retaining the same one to the other, means for retaining the dog in two positions, the said dog having oppositely disposed catches thereon adapted to separately engage the said rocker tread element, whereby the rocker is controlled for enabling forward and rearward movement to be imparted to the said base member.

LAWRENCE A. CLARK.

References Cited in the file of this patent

UNITED STATES PATENTS

| Number | Name | Date |
|---|---|---|
| 2,207,443 | Schneider | July 9, 1940 |